United States Patent [19]
McGhee

[11] Patent Number: 6,131,979
[45] Date of Patent: Oct. 17, 2000

[54] VAN HAND RAIL

[76] Inventor: Demaris A. McGhee, 1725 Canary Dr., High Ridge, Mo. 63049

[21] Appl. No.: 09/299,108

[22] Filed: Apr. 26, 1999

[51] Int. Cl.$^7$ ....................................................... B60P 3/05
[52] U.S. Cl. .............................. 296/24.1; 296/71; 296/1.1
[58] Field of Search ........................... 296/24.1, 71, 1.1; 280/181; 414/921; 105/341, 354, 401

[56]           References Cited

U.S. PATENT DOCUMENTS

| Re. 21,327 | 1/1940 | Rydquist | 105/354 |
|---|---|---|---|
| 1,315,436 | 9/1919 | Udall | 105/354 |
| 1,978,960 | 10/1934 | Schlegel | 105/354 |
| 2,472,132 | 6/1949 | Walker | 105/354 |
| 2,672,103 | 3/1954 | Hormes | 105/354 |
| 2,777,729 | 1/1957 | Nieratko | 105/354 |
| 3,210,875 | 10/1965 | Schwenkler | 362/479 |
| 4,072,339 | 2/1978 | Rothlisberger | 296/71 |
| 4,266,318 | 5/1981 | Dauwalder | 296/71 |
| 4,570,545 | 2/1986 | Sherrow | 105/354 |
| 4,626,016 | 12/1986 | Bergsten | 296/1 R |
| 4,912,808 | 4/1990 | Blakely | 16/114 R |
| 5,104,169 | 4/1992 | Kopnski | 296/1.1 |
| 5,519,917 | 5/1996 | Cordonnier | 16/110 R |

FOREIGN PATENT DOCUMENTS

| 814482 | 6/1959 | United Kingdom | 296/71 |
|---|---|---|---|

*Primary Examiner*—Joseph D. Pape
*Assistant Examiner*—Kiran Patel
*Attorney, Agent, or Firm*—Henderson & Sturm LLP

[57]           ABSTRACT

A safety hand grip for use in entering and exiting the cargo door of a van or similar vehicle comprising a pair of mounting brackets, one securable to the floor of the vehicle the other securable to the sidewall of the vehicle, and a pole that is detachably securable between the two mounting brackets by the user when needed and that can be detached and removed for storage when not needed.

1 Claim, 1 Drawing Sheet

VAN HAND RAIL

CROSS-REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to the field of vehicle accessories, and more particularly to a safety hand rail for a van.

2. Description of the Related Art

As can be seen by reference to the following U.S. Pat. Nos. 4,072,339; 4,266,318; 4,626,016; 4,912,808; 5,104,169 and 5,519,917 the prior art is replete with myriad and diverse vehicle hand rails.

While all of the aforementioned prior art constructions are more than adequate for the basic purpose for which they have been specifically designed, they are uniformly deficient with respect to their failure to provide a simple, efficient and practical safety hand rail for a van.

As a consequence of the foregoing situation, there has existed a need for a new and improved van hand rail and the provision of such a construction is a stated objective of the present invention.

BRIEF SUMMARY OF THE INVENTION

Briefly stated, the present invention provides a safety hand grip for use in entering and exiting the cargo door of a van or similar vehicle comprising a pair of mounting brackets, one securable to the floor of the vehicle the other securable to the sidewall of the vehicle, and a pole that is detachably securable between the two mounting brackets by the user when needed and that can be detached and removed for storage when not needed.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
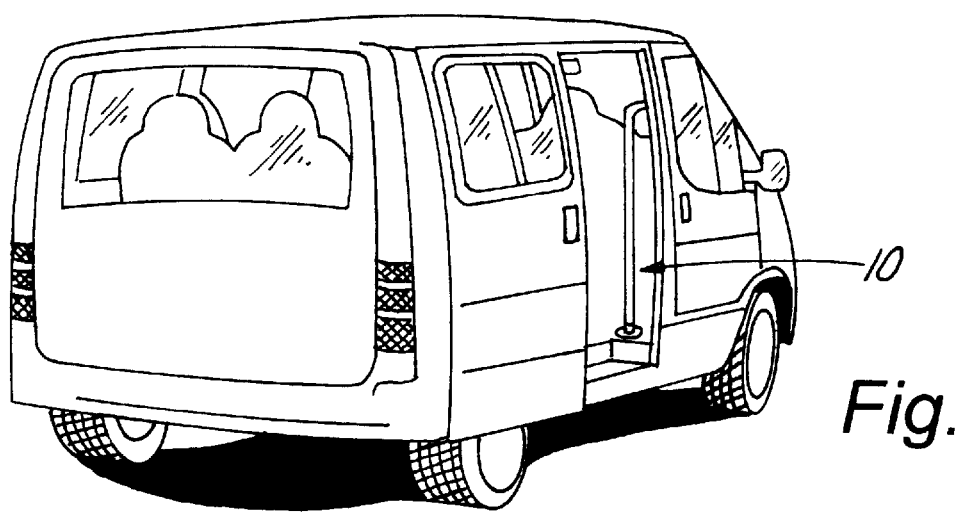
FIG. 1 is a perspective view of a van using the hand rail of the present invention.
Figure 2:
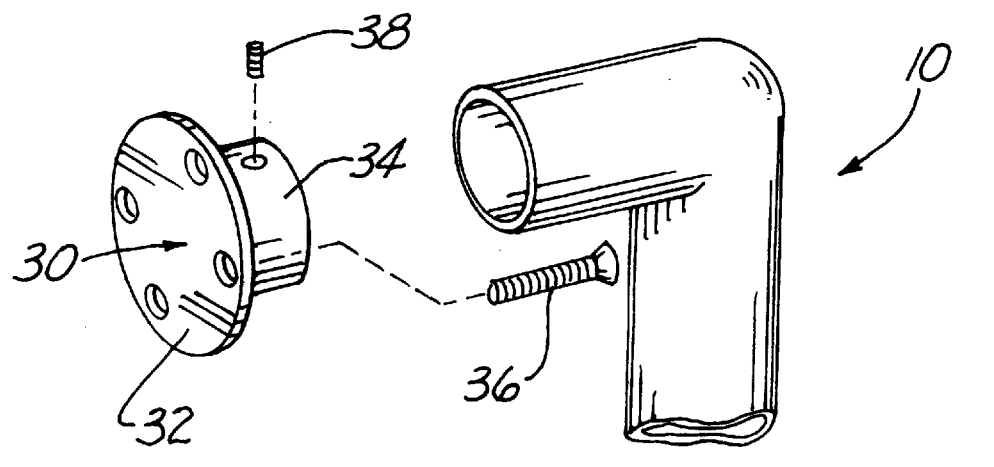
FIG. 2 is an exploded perspective view of the hand rail.
Figure 2:
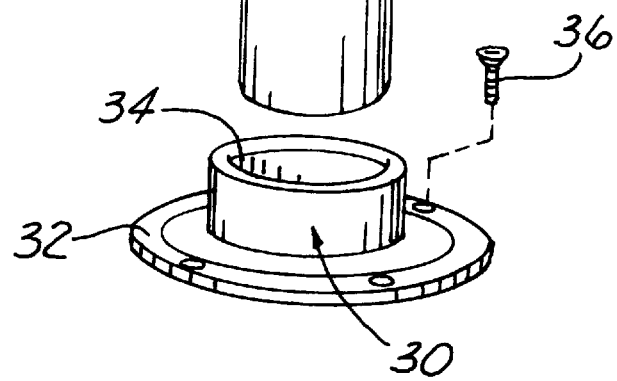

As can be seen by reference to the drawings, and in particularly to FIG. 1, the van hand rail that forms the basis of the present invention is designated generally by reference number (10). The hand rail (10) is a stainless steel pole (20) approximately 2 inches in diameter and 5 to 6 feet long that has a 90 degree bend on one end. The device is installed into a standard type van with the use of two circular mounting plates (30) which are bolted to the floor or step, and to the sidewall of the van. The pole (20) is then attached to the mounting plates (30). As an option, rail (10) could be designed as a straight pole, which would attach to the floor and to the roof of the van. In this variation, the pole (20) would be custom cut to fit the specific van into which it is being installed. When installed, the device would in no way interfere with the operation of the front seats. The hand rail (10) would be sold as an after market accessory for installation into any existing van. It could also be incorporated into the design of a newly manufactured vans.

Each plate (30) includes a flange (32) and a socket (34) that receives an end of the pole (20). The plates (30) are attached to the floor or sidewall of the van by bolts (36) and a set screw (38) secures the end within the socket (34). The hand rail (10) may be quickly and easily removed by loosening the set screw (38) and pulling the ends out of the sockets (34).

In use, the user simply mounts the hand rail (10) into their van with the use of the two mounting plates (30), bolting them to the floor or step, and to the sidewall. When installed, the device protrudes out approximately 3 inches from the wall, next to the side door opening. They would then enjoy the benefit of having a sturdy grab rail (10) which would allow anyone entering or exiting the van to do so with far less chance of slipping or falling. In addition, it's use would make entering the van far easier, as the user would be able to pull themselves up and into the van. Use of the hand rail (10) provides a very practical and easy to use method of allowing anyone to more safely enter or exit a van. This device would be especially beneficial to those who may be handicapped, elderly, or overweight.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A safety hand rail, in combination with a vehicle having a cargo door, a floor and sidewalls, the hand rail consisting of:

a first mounting plate attached to the floor of the vehicle adjacent the cargo door, the first mounting plate including a floor flange attached to the floor and a floor socket extending up from the floor flange;

a second mounting plate attached to the sidewalls of the vehicle adjacent the cargo door spaced above the first mounting plate, the second mounting plate including a sidewall flange attached to the sidewall and a sidewall socket extending out from the sidewall, the sidewall socket having an opening adapted to receive a set screw;

a pole including a vertical section having a first end, and a horizontal section having a second end, the first end being matingly received within the floor socket, and the second end being matingly received within the sidewall socket and secured therein by the set screw; and wherein the floor socket and the sidewall socket are circular and the vertical section of the pole is about four feet in length.

* * * * *